United States Patent
Rubio et al.

(10) Patent No.: US 8,263,154 B2
(45) Date of Patent: Sep. 11, 2012

(54) METHOD FOR THE PRODUCTION OF WHOLE NIXTAMALIZED CORN FLOUR, USING A VACUUM CLASSIFIER COOLER

(76) Inventors: Felipe A. Rubio, Edinburg, TX (US);
Manuel J. Rubio, Miami, FL (US);
Roberto Contreras, Guadalupe (MX);
Francisco J. Sosa, Guadalupe (MX);
Felipe J. Sánchez, Guadalupe (MX); J. Fernando Ramirez, Guadalupe (MX)

( * ) Notice: Subject to any disclaimer, the term of this patent is extended or adjusted under 35 U.S.C. 154(b) by 411 days.

(21) Appl. No.: 12/240,282

(22) Filed: Sep. 29, 2008

(65) Prior Publication Data
US 2010/0080881 A1    Apr. 1, 2010

(51) Int. Cl.
*A23L 1/00* (2006.01)

(52) U.S. Cl. ........ 426/472; 426/443; 426/507; 426/510; 426/518

(58) Field of Classification Search .......... 426/510–511, 426/506–507, 463–464, 622, 626, 518, 443, 426/465, 472; 241/9–12, 39, 165, 19
See application file for complete search history.

(56) References Cited

U.S. PATENT DOCUMENTS

| | | | |
|---|---|---|---|
| 529,092 A | 11/1940 | Miller | |
| 2,713,977 A | 7/1955 | Heinrich | |
| 3,268,179 A * | 8/1966 | Glynn et al. | 241/19 |
| 3,313,494 A * | 4/1967 | Peterson | 241/56 |
| 4,326,455 A | 4/1982 | Rubio et al. | |
| 4,331,690 A | 5/1982 | Bradshaw | |
| 4,513,018 A | 4/1985 | Rubio | |
| 5,401,522 A | 3/1995 | Reeg | |
| 5,447,742 A | 9/1995 | Malvido et al. | |
| 5,558,898 A | 9/1996 | Sunderland | |
| 6,025,011 A | 2/2000 | Wilkinson et al. | |
| 6,217,442 B1 | 4/2001 | Schmidt | |
| 6,344,228 B1 | 2/2002 | Rubio et al. | |
| 6,387,437 B1 | 5/2002 | Martinez-Bustos et al. | |

(Continued)

FOREIGN PATENT DOCUMENTS

JP    53-125908    11/1978

(Continued)

OTHER PUBLICATIONS

Particulate Solids, The third fluid phase in chemical engineering, F. Zenz, Chemical Engineering Nov. 28, 1983, 61-67f.

(Continued)

*Primary Examiner* — Steven Leff
(74) *Attorney, Agent, or Firm* — Young & Thompson

(57) ABSTRACT

A process and apparatus for the continuous production of whole nixtamalized corn flour, includes a whole clean corn precooking with a lime solution to effect a partial hydrolysis of pericarp and bran with reduced soluble corn loss in Nejayote wastewater. Moisture content is then stabilized, followed by milling and drying preconditioned corn for further endosperm gelatinization in the whole ground kernel, venting and separating the dry-milled fractions. Adiabatic cooling under a partial vacuum of the vented dry-grind fractions and classifying with an upwardly airstream to strip the fine-grind from the coarse grind while the latter is separated downwardly as a moving bed. Venting and separating the classified fine grind fraction; sifting and recovering the cooled and classified fine grind so segregated from the coarse grind, remilling and further screening the coarse grind produces a whole nixtamalized corn flour for tortilla and whole grain corn-based foods.

20 Claims, 4 Drawing Sheets

U.S. PATENT DOCUMENTS 7,220,443 B2 5/2007 Rivero-Jimenez et al.
2003/0143308 A1 7/2003 Rubio et al.
2006/0251791 A1* 11/2006 Rubio et al. .................. 426/622

FOREIGN PATENT DOCUMENTS

| JP | 54-050479 | 4/1979 |
| JP | 09-194848 | 7/1997 |
| JP | 2002-309266 | 10/2002 |

OTHER PUBLICATIONS

Handbook of Food Engineering, Dennis R. Hldman et al., 437, 473-476.

Handbook of Food Engineering Practice, Kenneth Valentas et al., 127-131.

* cited by examiner

| Biochemical content (g/100 g):* Nixtamalized corn flours | | | |
|---|---|---|---|
| Nutrient | *Whole (WNCF) | *Commercial | Raw corn |
| Water | 11.0 | 11.0 | 11.0 |
| Protein | 8.3 | 8.1 | 9.5 |
| Fat | 3.5 | 4.0 | 4.6 |
| Ash | 1.4 | 1.2 | 1.5 |
| Calcium | 0.06-0.20 | 0.06-0.11 | 0.01-0.03 |
| Dietary fiber: | 9.5 | 8.0 | 10.4 |
| (Soluble fiber) | (0.5-0.8) | (0.3-0.4) | (0.1-0.2) |
| Crude fiber | 1.7 | 1.2 | 3.5 |
| Starch | 66.3 | 67.7 | 63.0 |
| Total Calories: | 317 | 326 | 316 |
| Physico-chemical properties: *Nixtamalized corn flours | | | |
| Property | *Whole (WNCF) | *Commercial | Raw corn |
| Moisture (%) | 11.0 | 11.0 | 11.0 |
| Yield (g-dough/1000g) | 2400-2500 | 2100-2300 | 1300-1500 |
| Adhesivity | 0.7 | 0.4 | 0.0 |
| (% soluble fiber) | (0.5-0.8) | (0.3-0.4) | (0.1-0.2) |
| pH (11% solids) | 7.0-8.0 | 6.0-6.7 | 5.8-6.0 |
| Particle Size Distribution (% over) | Trimodal | Bimodal | Bimodal |
| US Mesh 45 (355 µ) | 5.6 | 0.8 | 30.0 |
| US Mesh 50 (300 µ) | 6.6 | 20.0 | 24.0 |
| US Mesh 80 (180 µ) | 26.5 | 18.0 | 11.0 |
| US Mesh 100 (150µ) | 38.0 | 13.0 | 8.0 |
| US Mesh 120 (125 µ) | 19.0 | 29.0 | 27.0 |
| US Mesh 200 (74 µ) | 2.8 | 19.0 | - |
| US Mesh 325 (44 µ) | 1.5 | 0.2 | - |

FIG. 2

METHOD FOR THE PRODUCTION OF WHOLE NIXTAMALIZED CORN FLOUR, USING A VACUUM CLASSIFIER COOLER

BACKGROUND OF THE INVENTION

1. Field of the Invention

The present invention relates to a method for the continuous production of nixtamalized corn flour and, more particularly, to one that achieves precooking of the whole corn with a lime solution, and the use of an adiabatic cooling and classifying under a partial vacuum during the manufacture of whole nixtamalized corn flour for the preparation of tortilla and whole grain corn-based foods.

2. Description of Related Art

Nixtamalized corn flour (NCF) is conventionally produced by alkaline cooking of food-grade corn under atmospheric pressure, steeping and washing, grinding the partially cooked corn (nixtamal) and drying to give corn masa flour. This flour is sieved and blended for different food product applications and it is usually supplemented with food-grade additives before packaging for commercial table tortilla and snack production. Maseca® is the main brand flour in the US and Latin America followed by Minsa, Ill. Cereal Mills (Cargill) and Quaker Oats. Bressani (Sustain, 1997) described both batch and continuous processes for cooking corn to produce instant masa flour. In the modern continuous process, the lime used is from 0.6 to 1.2% (based on corn) and mixed with equal parts of corn and potable water. The corn suspension is cooked by atmospheric steam injection and although the pericarp is partially removed during cooking and washing, there is still some fiber left from the corn (with a 7%-9% solid loss).

The traditional method of cooking maize with lime (1-2%) at the rural level is time consuming (around 14 to 15 hours) and requires hard labor. From 70% to 80% of the time is taken by the cooking and steeping-washing operations (a 1:3 corn to water ratio); that time can be decreased to 8-12 hours or less at the urban or cottage level (with a 11 to 13% corn loss; Bressani, 1990 in Sustain).

At the industrial or commercial level, the "grinding and dehydration" steps are major cost factors. In any case, the availability of an instant corn flour has many advantages such as convenience for the customer, less labor, lower water and energy use, a safe and stable product (3 to 4 months under normal storage conditions), and the possibility to use the flour as a carrier of a macronutrient (soybean, wheat and amaranth), micronutrients (amino acids, vitamins and minerals) along with novel nutraceuticals (prebiotics).

Corn and tortilla chips are the second most popular salted snack food in the USA, after potato chips. Any method which may decrease both time and cost, and still yield an acceptable nixtamalized corn dough or masa flour product per kilogram of raw corn, would be advantageous to the final customer. The mature dent corn kernel (Watson, 2003; 1993 in fao.org) has five separable components, on a dry weight basis: tip cap (0.8-1.1%), pericarp/hull (5.1-5.7%) and aleurone (2%), endosperm (81.1-83.5%) and germ (10.2-11.9%). The pericarp contains 90% insoluble fiber (67% hemicellulose-heteroxylans-, 23% cellulose and 0.1% lignin). Although bran is sometimes used as a synonym for pericarp, in the dry or wet-milling process the bran includes the pericarp, tip-cap, aleurone layer-isolated with bran- and adhering pieces of starchy endosperm.

There have been a few studies on indusrial corn arabinoxylans (soluble bran: Wolf et al. 1955) and lime-treated Maseca® pericarp and bran components (Vidal et al. 1999; MX Patent 206738). The food-guide pyramid (2005 in Mypyramid.gov) suggests eating half of your grains whole (6 oz. or grain-servings/day) along with 4.5 cups of fruit-vegetables/day for a 2000 calorie-diet. Only 8% of the U.S. population is estimated to consume at least 3 servings of whole-grain and 3 cups of fruit-vegetables/day. Modern eating habits are incresing both obesity and metabolic syndrome (47 million U.S. residents) with increased risk for cardiovascular disease and type-2 diabetes (AHRQ.gov). Starch is more digestible and its glycemic response increased 2-3 fold compared with coarsely ground flour or whole grain (Colagiuri et al. 2002). Therefore, a "calorie restriction" (30-40%) in high-fat/protein and sugar/starchy foods will also reduce the daily intake to maintain a healthy body-weight.

A whole-grain corn definition by the FDA has been requested (AACC, 2005) such that a whole-grain Nixtamalized corn masa flour (WNCF) has a 7.3% to 9.6% dietary fiber content. The AACC International (2006) comments on part II of the FDA's Draft Guidance on Whole Grain Label Statement provide: Cereals and Pseudocereals that, when consumed in whole form (including the bran, germ and endosperm) are considered whole grains. If intake is unchanged (Marquat, 2006), formulation modifications by adding whole-grain flours to existing cereal-based products would increase (50%) the number of 16-g whole-grain servings/day from 2.2 to 3.3. Both USDA and FDA have said that 51% of the total ingredients must be whole grain.

In this connection, reference is made to the following U.S. Pat. Nos. 6,387,437, 5,447,742, 4,594,260 and 4,513,018. These prior art methods for the industrial production of nixtamalized corn flour and dry masa flour involve high-temperature cooking and dehydration with low energy requirements for a high yield of the end product.

Two transport processes occur simultaneously during a cooling operation: a) heat transfer from convection, conduction and evaporation of free water, and b) mass transfer due to partial vapor-pressure gradients and due to total pressure gradients caused effected by high temperature or external-pressure. Total pressure-driven mass flow within a food may not only occur in high-temperature convective-transfer but also in moderate-temperature vacuum-transfer (Crapiste et al. 1997 and Rotstein, 1990). Phenomenological laws such as Newton's, Fourier's, Fick's and Darcy's law are based on proportionalities between a flux and a driving force. When more than one driving force is present in a coupled heat conduction and mass diffusion (moisture-transfer potential), cross-effects can occur such as the Soret (gradient temperature can cause mass transfer) and Dufour effect (gradient concentration can effect heat flow) in hygroscopic capillary-porous foods (Okos et al. 1992).

Having in mind the disadvantages of the prior methods, several applications were conducted to improve the efficiency of cooling by means of convective cooling (ie., using continuous heat-exchanger and dynamic/static equipment) as in U.S. Pat. No. 7,220,443 and Japanese patents (JP2002-309266, JP09-194848, JP54-50479 and JP53-125908). Other recent innovations related to adiabatic cooling (ie., using batch equipment with vacuum pumps and steam jets) as reflected by the following U.S. Pat. Nos. 6,025,011, 5,401,522 and 4,331, 690. In a reduced-pressure cooling, the temperature falls due to the latent heat until an equilibrium temperature is reached where the heat absorbed from the environment is equal to the heat loss during vaporization at the food surfaces or within pores. With the use of vacuum processing, the residence time of the food optimal for contaminating microbes is minimized, thus achieving a better sanitation/shelf-life than slower processes.

Classification is the separation of a particulate material into a coarse and fine fraction. The segregation has always been by size in flour production by using a mesh that allows only particles of a predetermined maximum size to pass through screens/sieves (from a large to a medium particle size range of 500 mm to 100μ or U.S. standard mesh 100). Other non-conventional methods have used density which is a major factor in centrifugal separators (cyclones) where fluid drag and gravitational forces are involved (Zenz, 1983 and Klumpar et al. 1986). Depending on the equipment used, dry classification might also be affected by size shape/distribution, electric, magnetic and surface properties. Air classifiers (static and dynamic ones) are widely used in the food industry to remove a solid from a clean gas generated by internal/external fans (with a low-pressure drop). In such equipment, classification is effected in a stream of air from a medium down to a submicron particle-size range (1000μ: U.S. mesh 18 down to 40μ or <U.S. mesh 400 with >99.9% efficiency). A key feature of a vortex-type separation is that the outer area moves slowly and the center moves fast. As the fine particles are moved inward they are also sucked into the inner vortex, frictional resistance is reduced and the particle speed is increased (similar to Coriolus effect due to earth's rotation).

Although the above described prior art methods can be useful useful in producing an increased yield of nixtamalized corn flour with a low-cost industrial application as well, a continuous process was still unavailable for the production of whole nixtamalized corn flour not only using a whole-grain corn precooking but also involving an adiabatic cooling with airflow classification under vacuum was still unavailable in the market at the time of the invention.

SUMMARY AND OBJECTS OF THE INVENTION

Accordingly, the present invention provides a method for continuous production of whole nixtamalized corn flour using a whole corn precooking, which generates a reduced waste of soluble corn, but also a high yield of the product.

Another object of the invention is to provide a whole grain corn flour for tortilla and derivatives thereof wherein such whole nixtamalized corn flour is uniform and improved in its biochemical and theological properties.

Still another objective is to use an industrial method and vacuum classifier-cooler not only to continuously produce a cooled and classified coarse-grind and fine-grind fractions but also to yield a fine whole-grain corn flour.

The above and other objects and advantages of the invention are achieved through a continuous process and apparatus applied to the production of whole nixtamalized corn flour, embodiments of which include providing a clean corn kernel and precooking with a lime solution so as to effect partial pericarp and bran hydrolysis along with endosperm gelatinization, reduced soluble corn loss in nejayote wastewater, stabilizing the moisture content to a desired optimum level for grinding, milling and drying the preconditioned kernel to produce further gelatinization, venting and separating the whole dry-milled fractions, adiabatic cooling and classifying under a partial vacuum of the vented dry-ground fractions, venting and separating the classified fine grind fraction, sifting and recovering the cooled and classified fine grind so produced from the coarse grind while regrinding the coarse grind and further screening it to obtain a whole nixtamalized corn flour for tortilla and whole grain corn-based foods.

BRIEF DESCRIPTION OF THE DRAWINGS

The invention will be more fully understood from the description which follows, taken with reference to the appended drawing in which:

FIG. 2 is a graph showing the biochemical content and physico-chemical properties of whole nixtamalized corn flour, commercial masa flour and milled raw corn flour;

DETAILED DESCRIPTION OF PREFERRED EMBODIMENTS

Figure 1:
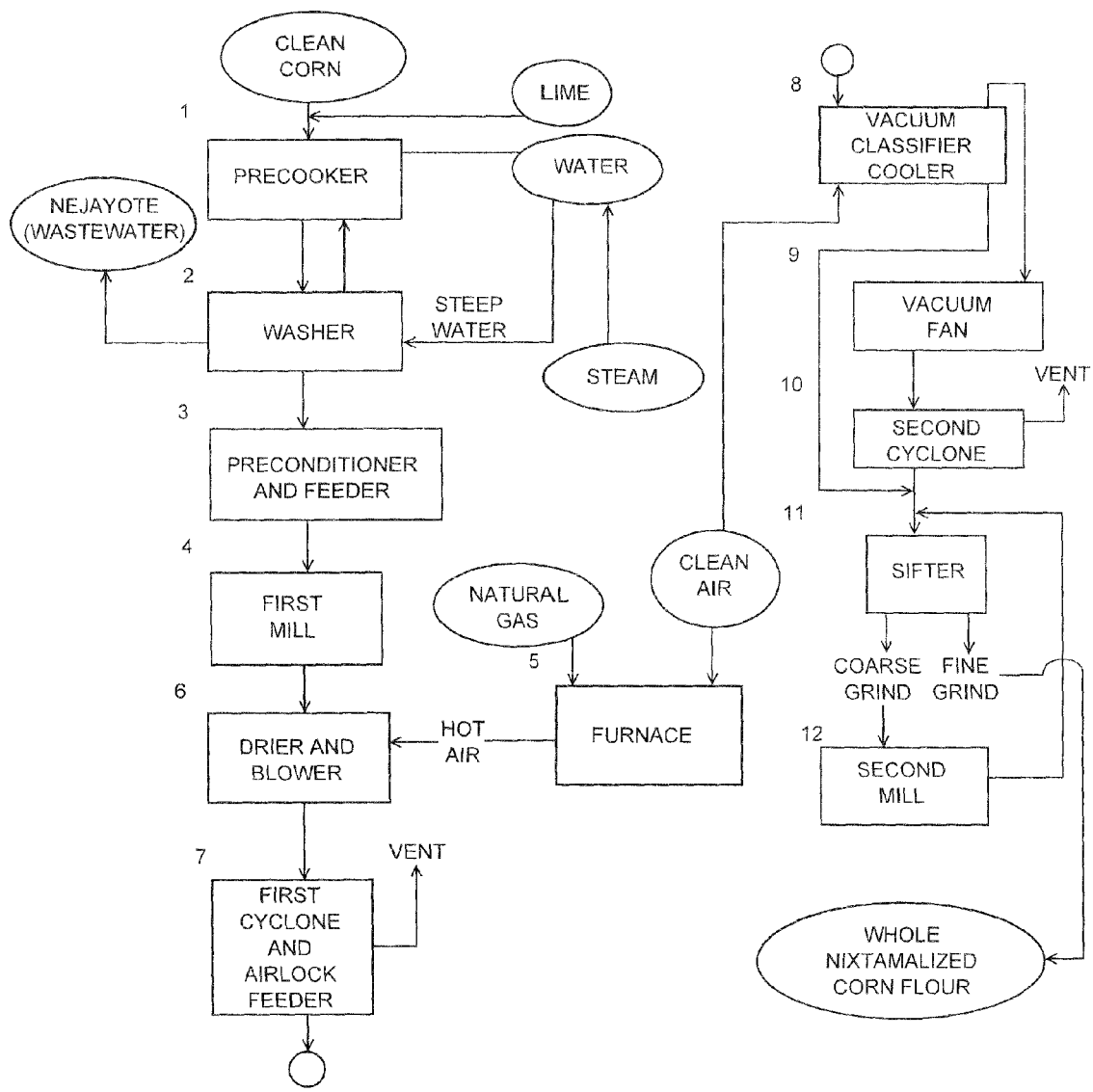
FIG. 1 depicts an embodiment of this is invention in flow-chart form illustrating the continuous process and depicting schematically the associated apparatus.

FIG. 1 shows a precooker 1; a washer 2; a preconditioner 3 with a feeder; a first mill 4, a furnace 5; a dryer 6 with an associated blower; a first cyclone 7 with an associated airlock feeder; a vacuum classifier-cooler 8; a vacuum fan 9; a second cyclone 10; a sifter 11; and a second mill 12.

The precooker 1 is fed with clean corn and a lime admixture into which steam-heated water is introduced to form an aqueous alkaline suspension (corn to water ratio of about 1:1 to about 1:1.5). By regulating the pressure of the saturated steam along with the kernel residence time, it is possible to precook the corn to a temperature of 75° to 98° C. (water boiling point) for a period of 20 to 35 minutes. Nejayote (wastewater or cook liquor) and water loss is replaced with recycled steepwater from the washer 2, which is regulated to maintain the solids content in the precooker solution of about 0.3% to about 1.6%. This allows the precooked kernel to be produced at moisture content of between 35% and 37%, while the pH is raised to about 8 to 12 with the addition of a 0.03% to 1.3% by weight lime (based on corn).

The precooker thus used causes a partial alkaline hydrolysis in the kernel that in turn promotes a rapid and uniform diffusion of the soluble lime-water (0.19% at 0° C. and 0.08% at 100° C., Bryant et al. 1997) through the tip-cap and pericarp cell-walls made of dietary fiber, and later on a slow permeation via the endosperm (aleurone and starchy) and germ increasing granule swelling. Steam heated-water and lime also soften and partially solubilize both cell-walls and starch, allowing a 15% to 35% reduction in soluble solids concentration (from about 0.3% to 1%) as compared to the previous commercial cooking processes (>2% solids in Nejayote effluent; 1% to 1.6% COD and pH of 9-11).

Hence, by not removing the pericarp and bran components we get a precooked whole corn kernel with a higher yield from about 2% to 4% than the commercial flour production methods. Literature reports on total dry matter loss, by mainly discarding corn pericarp and bran fractions (with 75% dietary fiber or nonstarch polysaccharides), during traditional Nixtamalization usually vary between 5 and 14% depending on the corn type and processing conditions (Sahal et al. 2001 and U.S. Pat. No. 6,387,437).

The partially cooked corn suspension is then passed to a washer 2 where it is sprayed with steam-heated water at a temperature of about 70° to about 90° C. for 30 to 60 seconds, which also serves to wash off excess soluble solids and lime into Nejayote (wastewater or steep liquor).

The washed corn is thereafter passed to a preconditioner 3 wherein the precooked corn is equilibrated for about 30-120 minutes, to obtain a residual moisture content of about 36%-38%.

Thereafter, the washed and conditioned corn is discharged into a first mill 4 by a feeder. The premilled corn and hot air coming from a furnace 5 is mixed and impelled by means of a blower, such that the suspended and premilled corn is partially dried by a dryer 6 whose design is known per se.

The premilled kernel is thereby flash dried at a high temperature from 190° C. to 230° C. for a short time of 0.5 to 3 seconds and it is partially gelatinized to yield a residual moisture content of 13% to 16% depending on the whole corn granulation being produced for tortilla or snack food. The large-sized and denser fraction is known as the coarse-grind, while the small-sized and lighter fraction is described as the fine-grind.

Moisture laden-hot air (90° C. to 140° C., and 15% to 18% moisture) is extracted with a first cyclone 7 and separated from the drier whole corn grind (80° C. to 90° C.) using an airlock feeder, whose design is known per se.

Figure 3:
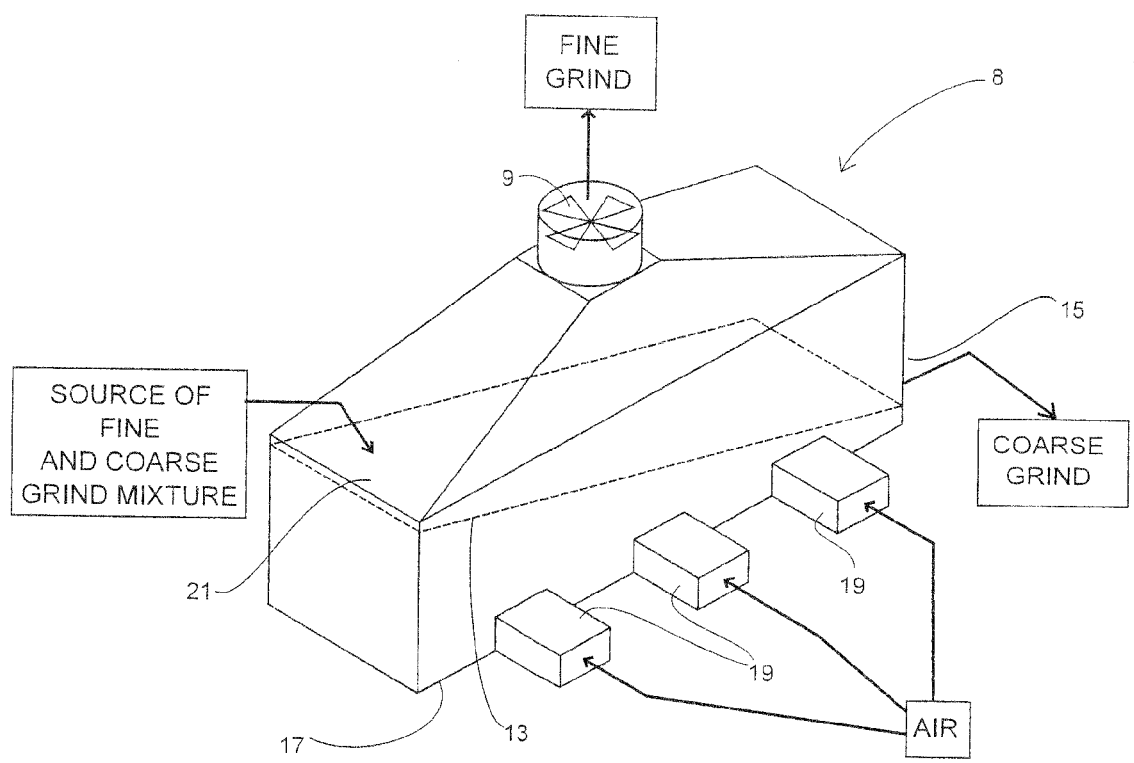
FIG. 3 is a perspective view of one embodiment of a vacuum classifier-cooler.
Figure 4:
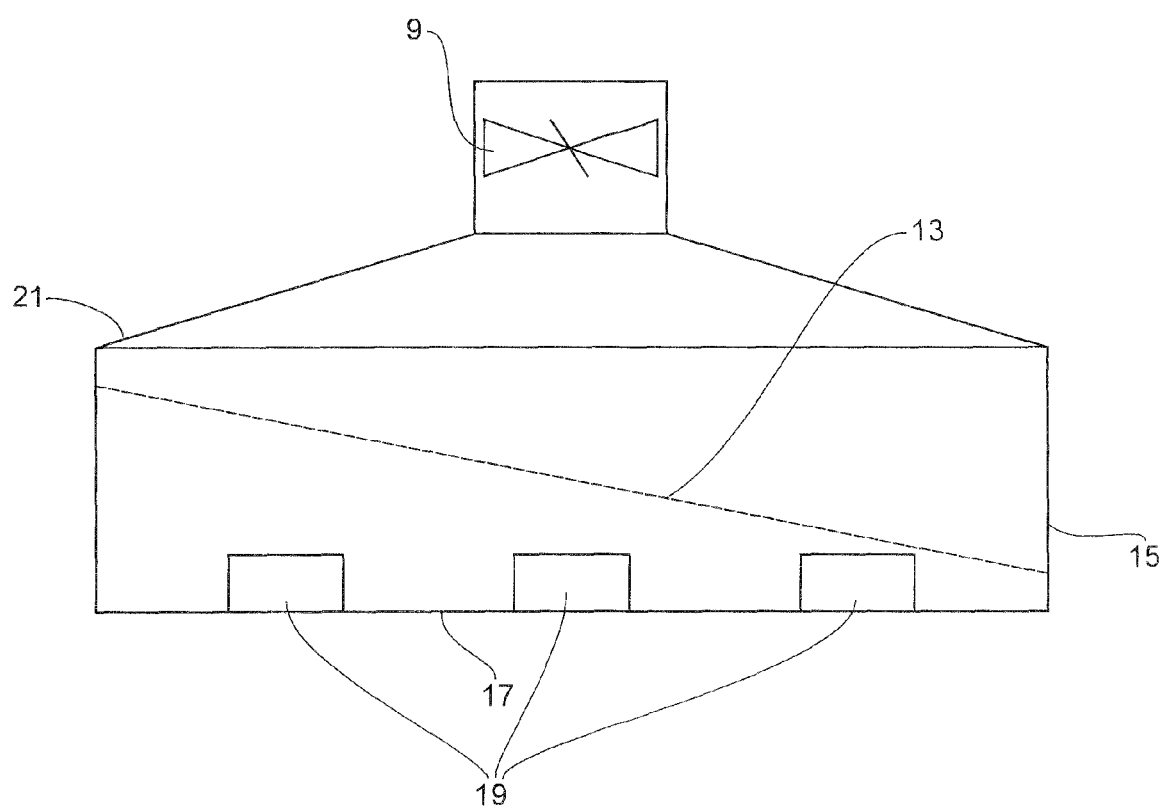
FIG. 4 is a side view of one embodiment of a vacuum classifier-cooler.

As illustrated in FIGS. 3 and 4, fed dry-grind fractions are countercurrently moved in a vacuum classifier-cooler 8 with a clean upflow of air drawn through the gravity moving bed by a vacuum fan 9. The dry-grind fractions are fed into an entrance end 21 of classifier-cooler 8. Upon entering the classifier-cooler, the mixture of fractions comes to rest upon a surface 13 of classifier-cooler 8. Surface 13 lies at an oblique angle to horizontal, so that an end of surface 13 near entrance end 21 is higher than an end of surface 13 more near exit end 15. Surface 13 is structured in such a way as to allow gas to pass therethrough while preventing all, or at least a vast majority of, the mixture of fine and coarse-grind fractions from falling through. Surface 13 may be made from a net or perforated plate, for example a mesh in the range of 12-25. As the mixture is initially fed into the entrance end 21, it increases in depth in classifier-cooler 8 until a sufficient volume has amassed to eject some of the mixture through exit end 15 that lies at an end of classifier-cooler 8 opposite entrance end 21.

Fan 9 draws clean air through air entrances 19 that open into an interior of classifier-cooler 8 through a side thereof, below a level of surface 13 and above classifier-cooler base 17. The air drawn by fan 9 passes through surface 13 and the mixture of fractions that lies thereon.

Mobility in the particles in the mixture of fractions imparted by the air passing therethrough, the oblique arrangement of surface 13, and the addition of more mixture into entrance 21 contribute to moving the mixture of fractions within classifier-cooler 8 downward and laterally toward exit end 15.

As the total gas pressure in the cooler is reduced below the pressure of saturated vapor at the temperature of the hot grind ("boiling point"), external and internal residual water (13%-16%) begin to evaporate readily and the latent heat required for evaporation comes mainly from the grind sensible heat (without an external heat supply). As a result, the grind temperature begins to fall as rapid vaporization begins as in the case of below-atmospheric adiabatic cooling (<760 mm Hg or <101.3 kPa). This boiling effect at reduced temperature has a high rate because its liquid latent heat is much higher than its vapor heat capacity.

The vacuum cooling arrangement is such that the clean cooling air (28° C. to 32° C., and 1.0 to 1.5% moisture) is sucked by the low-vacuum fan 9 and flows in a direction opposite to the gravity moving bed of grind particles. With the low-vacuum fan properly configured, the clean cooling air is drawn through the mixture of fine and coarse-grinds so that the warm fine-grind is stripped by the airstream from the upper part (45° C. to 50° C.), while the cold coarse-grind (24° C. to 32° C., and 11% to 14% moisture) is discharged from the exit end 15 of the moving bed type classifier-cooler 8.

The rate of flow of the mixture of fine and coarse-grind fractions, the volume of the classifier-cooler 8, and the rate of flow of the clean air through the classifier-cooler 8 are interrelated, and must be established so that the mixture spends sufficient time in the classifier-cooler 8 so that the fine-grind gets sufficiently dried so that it can be entrained in the air that exits through the top end of classifier-cooler 8 before being drawn out the exit end. Alternatively, spending too much time in the classifier-cooler 8 results in unnecessarily low efficiency.

In one embodiment, the classifier-cooler has a base 17 having an area of approximately 5.2 m in length between the entrance and exit ends 21 and 15, and a width of approximately 1.6 m. Vacuum fan 9 draws an air volume of approximately 18,000 to 36,000 $m^3$ per hour. A mass of approximately 8-11 tons of the mixture of fine and coarse grain are moved through the classifier-cooler 8 per hour. In FIGS. 3 and 4, the classifier-cooler 8 is illustrated as having three air entrances 19 through which the clean air enters before being drawn through the mixture. More or fewer ducts can be used, however.

The vacuum-assisted cooler can also operate as an "air sieve", with a superficial upward air velocity to achieve an expanded or gravity moving bed, and can directly exhaust a fine-grind with lower terminal velocities (0.3 to 1.5 m/s) rising in the upward airstream to the top end drawn by fan 9. In contrast, a coarse-grind with higher terminal velocities (1.6 to 3.2 m/s) falls to surface 13, and is removed from exit end 15. Thus, the denser coarse-grind will be affected most by gravitational force whereas the lighter fine-grind is affected most by air drag force produced with the low-vacuum fan 9 from about 3 minutes to about 20 minutes (absolute pressure of about 500 mm Hg or 65 kPa to about 740 mm Hg or 100 kPa).

The vacuum-cooled and classified fine-grind is then passed to a second cyclone 10, where the exhaust warm air (45° C. to 50° C., and 2% to 3% moisture) is vented and separated from the colder fine-grind (40° C. to 42° C.), thus further decreasing the residual moisture from 13% to 16% to about 8% to 11%.

After adiabatic cooling and extracting residual moisture, both cooled and classified coarse and fine-grind fractions are directed to a sifter 11 wherein the fine-grind is separated (under 40 to 325 mesh) as whole nixtamalized corn flour (from about 30% to about 35% of the total weight of incoming corn) and the coarse-grind is further processed in a second mill 12.

This cooled coarse-grind fraction (from about 65% to about 70% of the total weight of incoming corn) increased its grinding rate as its total moisture content decreased (from 13% to 16% to about 11% to 14%). However, the fracture or breakage resistance increases with decreasing particle size (more elastic deformation). Size reduction requires increasingly more energy if fine particles are produced to a milling limit. The reground product is recycled into the sifter 11 for further sieving and producing a homogeneous whole nixtamalized corn flour.

The whole-corn precooking of the present invention results in a 15% to 35% reduction in soluble solids concentration in Nejayote effluent with correspondingly lower organic load and environmental costs (Ramirez and Alvarez, 1995). Still further, the present process and apparatus produce a whole nixtamalized corn flour yield increases of 96% to about 98% of the total weight of incoming corn as compared to the traditional and commercial masa flour which may yield from 86% to 95%.

The instant masa flour produced according to the invention may be rehydrated by mixing with warm water from a 1:1.1 to about 1:1.5 ratio to form a traditional dough (53% to 60% moisture) with a consistency and cohesive dough strength, without stickiness, for a traditional tortilla preparation (44% to 54% final moisture) and snacks thereof.

FIG. 2, shows a typical biochemical average composition for whole nixtamalized corn flour (WNCF), commercial nixtamalized corn or masa flour (NCF) and milled raw-corn for tortilla and snacks (Watson, 2003, USDA, 2001 and Gomez, 1991).

The whole nixtamalized corn flour and commercial masa flour (with 8% dietary fiber and 0.06%-0.11% calcium) both contain particles from the endosperm, germ, pericarp and bran fractions. However, the whole flour contains about 9.5% dietary fiber and from about 0.06% to about 0.2% calcium. If the grain has been minimally-processed (e.g., cracked, crushed, rolled, extruded, lightly pearled and/or cooked), the whole-food product should be considered whole grain, even though small amounts of pericarp and bran components are lost (<5%) when using the traditional and ancient processing methods like "Nixtamalization" which is lime-cooking of whole maize or "Corn bulgur" which is parboiled whole or crushed corn (Elgun et al. 1990). Hence, Whole nixtamalized corn flour should have more than 95% of the three components (and retaining their same relative proportions) as the original kernel in order to be called whole grain (AACC, 2006). It can be further used as a cereal-base and multifunctional ingredient during the manufacture of grain-based foods.

In the traditional process (nixtamal mills) alkaline cooking and steeping of corn, using calcium hydroxide, nixtamal is steeped in the cooking water and then washed to remove "soluble solids" (pericarp, bran, endosperm and germ fractions) and excess lime (less than 0.2% is retained by nixtamal kernel, Serna et al. 1990 in AACC, 2003). Other effects in the process are desirable functional properties for tortillas (flavor, color, texture) as well as others that are important for the prevention of pellagra (niacin deficiency) and osteoporosis. A corn fiber was extracted using calcium hydroxide (pH 11-12) with a 27% yield of Hemicellulose-B (soluble) and Hemicellulose-A (insoluble). This corn fiber gum (arabinoxylan) can function as a thickener with apparent viscosities higher than gum arabic. Dry-milled corn bran (fine) yielded from 41% to 46% while wet-milled corn bran (coarse) had a lower yield from 32% to 40% (Wolf et al. 1955).

FIG. 2, gives the physico-chemical content of whole nixtamalized corn flour (WNCF), commercial nixtamalized corn or masa flour and milled raw corn for tortilla and snacks (Almeida al. 1996 and Gomez et al. 1987 in AACC, 2003).

Commercial masa flour for the same application (tortilla and snack food) can have different physical, chemical and rheological properties. Nixtamalized coarse flour (>20 mesh) had a low-peak apparent viscosity whereas a nixtamalized fine flour (<100 mesh) showed a high-peak, suggesting that coarse-flour hydrate more slowly and develop less viscosity (Gomez et al. 1991). The masa flours only show a bimodal particle size distribution with large-sized mode granules (≧50 mesh or 300μ and 21%) and intermediate-sized mode granules (less/equal than 120 mesh or 125μ and 48%) producing not only a low adhesivity for a masa dough but also a low yield for tortilla making.

The whole grain flour can contain large-sized mode (≧50 mesh or 300μ and 12%), intermediate-sized mode (≧100 mesh or 150μ and 65%) and small-sized mode (less/equal than 200 mesh or 74μ and 4%) particles yielding a trimodal particle size distribution. The large-granules are pieces of remnant pericarp, peripheral endosperm and germ. The intermediate ones are mostly hard/soft endosperm and germ pieces. The small ones are mainly bran particles. The ratio of horny (hard and translucent) to floury (soft and opaque) endosperm may average from about 0.5:1 (~30%) to about 2.5:1 (~70%) in yellow and white dent corn (Yuan et al. 1996). Adhesion forces are largely responsible for cohesive strength of food powders which, at constant porosity, is approximately inversely proportional to the particle size: thus fine powders tend to agglomeration. In this invention, the yield and adhesivity for whole nixtamalized corn flour are higher than commercial flour, because of a water soluble pericarp and bran fractions. This functional gum-like dispersion (from 0.5% to about 0.8% soluble fiber and similar to CMC used in masa flour: 0.3% to 0.5%) may impart not only a high water-binding capacity, but also a high adhesivity to corn dough for tortilla and snack making. Any additive that binds water will improve the tortilla rollability or decrease the firmness/staling and crumbliness of corn tortillas made from commercial flour.

From the foregoing, it will be apparent that it is possible to manufacture a vacuum cooled and classified whole nixtamalized corn flour for tortilla and other whole-corn based foods, with a continuous process which is efficient because of a reduced corn solid loss, wherein the recovery of this loss results in a higher yield of flour than would have been possible absent the features of this invention.

It is to be understood that the embodiments of this invention herein illustrated and described in detail and with published references, are by way of illustration and not of limitation. Other changes and modifications are possible and will present themselves to those skilled in the prior art.

We claim:

1. A method for making whole nixtamalized corn flour, comprising continuously and repeatedly performing the following steps:

providing a cleaned corn kernel comprising endosperm, germ, pericarp and bran components;

precooking the cleaned corn kernel in a lime solution to effect a partial pericarp and bran hydrolysis and endosperm gelatinization;

washing said precooked cleaned corn kernel to remove soluble solids and excess lime into nejayote wastewater and to stabilize a moisture content of said washed precooked corn kernel;

milling said washed and stabilized corn kernel and hot-air drying said milled corn kernel for further gelatinization to obtain a mixture of a coarse-grind fraction and a fine-grind fraction;

venting said milled and dried mixture of coarse-grind and fine-grind fractions while exhausting moist air;

feeding said milled and dried mixture to an entrance end of an air classifier-cooler, the classifier-cooler comprising:
the entrance end and an exit end opposite the entrance end,
a flat surface-bed spanning between the entrance end and the exit end and positioned at an oblique angle to horizontal so that an end of the surface-bed near the entrance is higher than an end of the surface-bed near the exit, the surface-bed having a structure that allows air to pass therethrough,
at least one air intake having an opening that opens into an interior of the classifier-cooler, the opening positioned below the surface-bed, and
a fan positioned above the surface-bed;
allowing the fed mixture to flow over the flat surface-bed and toward the exit end;
applying a partial vacuum with the fan to draw clean air from the air intake and through a moving bed of said milled and dried mixture of coarse and fine-grind fractions to adiabatically cool the mixture, the clean air having a superficial upward air velocity selected to be sufficient to exhaust the fine-grind fraction from the cooled mixture but insufficient to exhaust the coarse-grind fraction;

air classifying the cooled mixture of coarse-grind and fine-grind fractions under the partial vacuum to separate an air classified fine-grind fraction from an air-classified coarse grind fraction;

venting the air-classified fine-grind fraction and further separating said fine-grind fraction while exhausting moist air;

recombining said separated air-classified coarse-grind and fine-grind fractions;

sifting said recombined air-classified coarse-grind and fine-grind fractions to separate and recover a sifted fine-grind fraction of 40 to 325 mesh, from the sifted coarse-grind fraction;

regrinding and resifting said sifted coarse-grind fraction to recover additional sifted fine-grind fraction; and utilizing the sifted fine-grind fractions to prepare the whole nixtamalized corn flour.

2. The method according to claim 1, wherein said precooking step utilizes about 0.03% to 1.3% by weight lime based on corn kernel.

3. The method according to claim 1, wherein said vented dry coarse-grind and fine-grind fractions are adiabatically cooled under an absolute pressure of about 65 kPa to about 100 kPa and the cooling is completed in a time ranging from 3 minutes to 20 minutes.

4. The method according to claim 1, wherein the step of applying a partial vacuum and drawing clean air is performed using a low vacuum fan, and comprises subjecting the cooled coarse-grind and fine-grind fractions with a countercurrent stream of air, and stripping the fine-grind from the coarse-grind at a velocity of from about 0.3 m/s to about 1.5 m/s.

5. The method according to claim 1, further comprising feeding the vented dry coarse-grind and fine-grind fractions to a same apparatus used in the cooling and classifying steps.

6. The method according to claim 1, further comprising recycling the reground coarse-grind fraction to a same apparatus used in the sifting and recovering step.

7. The method according to claim 1, wherein a yield of said whole nixtamalized corn flour is in a range of about 96% to about 98% of the total weight of cleaned corn kernel.

8. The method according to claim 1, further comprising rehydrating said whole nixtamalized corn flour by mixing with warm water from about a 1:1.1 to about 1:1.5 ratio to form a dough of 53% to 60% moisture having high dough consistency and cohesive dough strength without stickiness for a traditional tortilla preparation of 44% to 54% final moisture and derivatives thereof.

9. A method for making whole nixtamilized corn flour, comprising:
a) providing an air classifier-cooler, the classifier-cooler comprising:
an entrance end and an exit end opposite the entrance end,
a flat surface-bed spanning between the entrance end and the exit end and positioned at an oblique angle to horizontal so that an end of the surface-bed near the entrance is higher than an end of the surface-bed near the exit, the surface-bed having a structure that allows air to pass therethrough,
at least one air intake that opens into an interior of the classifier-cooler and positioned below the surface-bed, and
a fan positioned above the surface-bed;

b) drawing a partial vacuum with the fan to draw air through the at least one air intake, into the interior of the classifier-cooler and through the surface-bed;
c) feeding a mixture of cooked and milled corn particles to the entrance end of the classifier-cooler and on to the surface-bed, the corn particles comprising a mixture of fine-grind and coarse-grind fractions;
d) allowing the milled corn particles to travel down the surface-bed and laterally toward the exit end via gravity;
e) drawing the air through the milled corn particles as the corn particles travel down the surface-bed to adiabatically cool the corn particles, wherein the air has an upward air velocity sufficient to separate the fine-grind fraction from the coarse grind-fraction;
f) air classifying the cooled corn particles to separate the fine-grind fraction from the coarse-grind fraction; and
g) utilizing the separated fine-grind fraction to prepare the whole nixtamilized corn flour.

10. The method of claim 9, further comprising:
cooking cleaned corn kernel in a lime solution to effect partial pericarp and bran hydrolysis and endosperm gelatinization;
washing the cooked corn kernel to remove soluble solids and excess lime, and to stabilize a moisture content of the cooked corn kernel;
milling and hot-air drying the washed corn kernel to obtain the mixture of cooked and milled corn particles.

11. The method of claim 10, wherein the cooking step uses about 0.03% to 1.3% lime by weight of the corn kernel.

12. The method of claim 9, further comprising:
sifting the air-classified and separated fine-grind fraction to separate and recover a sifted fine-grind fraction having a size in a range of 40 to 325 mesh; and
utilizing the sifted fine-grind fraction to prepare the whole nixtamilized corn flour.

13. The method of claim 9, further comprising:
sifting the air-classified and separated coarse-grind fraction to separate and recover a sifted fine-grind fraction having a size in a range of 40 to 325 mesh; and
utilizing the sifted fine-grind fraction to prepare the whole nixtamilized corn flour.

14. The method of claim 13, further comprising, after sifting the coarse-grind fraction, re-milling the sifted coarse-grind fraction; and
resifting the re-milled coarse grind fraction to recover a sifted fine-grind fraction having a size in a range of 40-325 mesh.

15. The method of claim 9, wherein during the air classifying step (f) the separated fine-grind fraction passes through the fan and is collected.

16. The method of claim 9, wherein the fan draws a partial vacuum in a range of 65 kPa to 100 kPa.

17. The method of claim 9, wherein the surface-bed comprises a net or a perforated plated with a mesh in a range of 12-25.

18. The method of claim 9, wherein the coarse-grind fraction is collected from the exit end of the air classifier-cooler.

19. The method of claim 9, wherein the fan draws an air volume in a range of 18,000-36,000 $m^3$ per hour.

20. The method of claim 9, wherein the air classifier-cooler comprises at least three air intakes.

* * * * *